Patented Mar. 4, 1924.

1,485,940

UNITED STATES PATENT OFFICE.

HERMAN F. WILLKIE, OF BALTIMORE, MARYLAND, ASSIGNOR TO U. S. INDUSTRIAL ALCOHOL CO., A CORPORATION OF WEST VIRGINIA.

PURIFICATION OF FUSEL OIL AND AMYL ALCOHOL.

No Drawing. Application filed December 29, 1921. Serial No. 525,757.

*To all whom it may concern:*

Be it known that I, HERMAN F. WILLKIE, a citizen of the United States, a resident of Baltimore, in the State of Maryland, have invented a certain new and useful Purification of Fusel Oil and Amyl Alcohol, of which the following is a specification.

This invention relates to the purification of fusel oil and amyl alcohol. The invention is adapted to the purification of various kinds of impure amyl alcohol, and since the latter may be obtained in large quantities from fusel oil, the purification of crude fusel oil will be set forth in detail by way of a specific example of the process of the invention.

Fusel oil is placed in a suitable receptacle which may be agitated, and a 4% solution of potassium permanganate is run into the fusel oil slowly with constant stirring. During the introduction of the permanganate, the temperature is kept below 25° C. so that there will be no destruction of the amyl alcohol itself, and furthermore the permanganate is maintained only in a slight excess so that it will not be able directly to attack the amyl alcohol. The addition of the permanganate is continued until a distinct pink color remains for some minutes after the last addition. When all of the permanganate has been added to the mixture, the latter is allowed to stand and settle, and this operation may be expedited by a slight warming to about 40° C. for a few minutes.

The layer of amyl alcohol is separated from the aqueous layer and directly distilled to obtain a chemically pure product. This operation may be varied by filtering the reaction mixture without preliminary settling, and the amyl alcohol layer may thereafter be rectified, or there may be a combination of both methods, that is, some settling and removal of the amyl alcohol may be allowed to take place, and then the remainder may be filtered and the amyl alcohol added to that previously removed, whereupon it may be rectified.

The concentration of the potassium permanganate may of course be varied. For example, it may be increased to 10% or may be diminished to .01%, but care should be taken to avoid excesses which would attack the amyl alcohol itself. Other oxidizing agents such as chromates, peroxides, etc., may be employed.

As many apparently widely different embodiments of this invention may be made without departing from the spirit thereof, it is to be understood that I do not intend to limit myself to the specific embodiment thereof except as indicated in the appended claims.

I claim:

1. The process of purifying an impure amyl alcohol comprising treating it with an oxidizing agent while cooling the reaction mixture.

2. The process of purifying an impure amyl alcohol comprising treating it with a potassium permanganate solution in slight excess while cooling the reaction mixture.

3. The process of purifying an impure amyl alcohol comprising treating it with a potassium permanganate solution in slight excess while cooling the reaction mixture, allowing the amyl alcohol to separate out, and purifying and distilling it.

4. The process of purifying an impure amyl alcohol comprising treating it with a slight excess of an oxidizing agent below 25° C.

5. The process of purifying an impure amyl alcohol comprising treating it with a slight excess of a permanganate solution having a strength between .01% and 10% at a temperature below 25° C.

6. The process of purifying an impure amyl alcohol comprising the step of treating it with a substantially neutral oxidizing agent in an amount sufficient only to oxidize the impurities present and at a temperature sufficiently low to prevent the destruction of the amyl alcohol.

7. The process of purifying an impure amyl alcohol comprising the step of treating it with a substantially neutral oxidizing agent in an amount sufficient only to oxidize the impurities present, while at the same time cooling the reaction liquid to prevent destruction of the amyl alcohol.

In testimony that I claim the foregoing, I have hereunto set my hand this 5th day of December, 1921.

HERMAN F. WILLKIE.